H. P. DAGUE.
LAWN EDGE TRIMMER.
APPLICATION FILED MAR. 19, 1909.
937,579.
Patented Oct. 19, 1909.
2 SHEETS—SHEET 1.
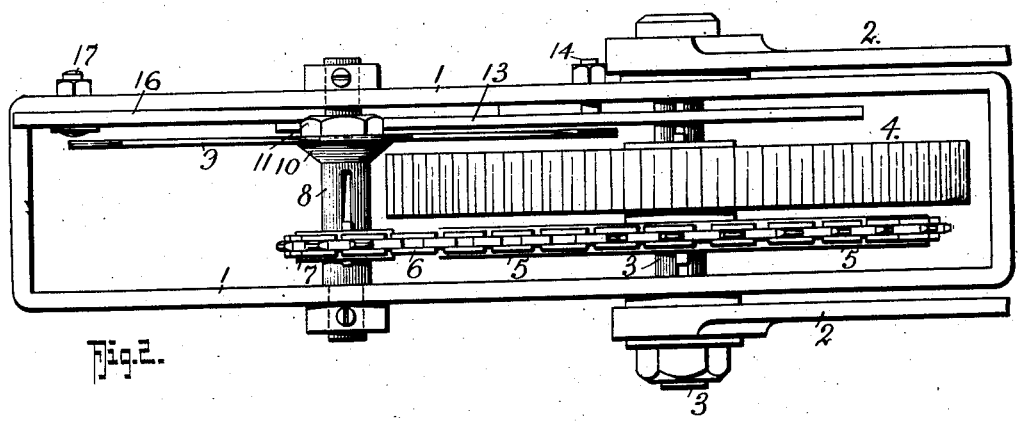
WITNESSES:
J. Theodore Schrott
May Immich
INVENTOR
Harry P. Dague.
BY
Fred G. Dieterich
ATTORNEYS.

H. P. DAGUE.
LAWN EDGE TRIMMER.
APPLICATION FILED MAR. 19, 1909.
937,579.
Patented Oct. 19, 1909.
2 SHEETS—SHEET 2.
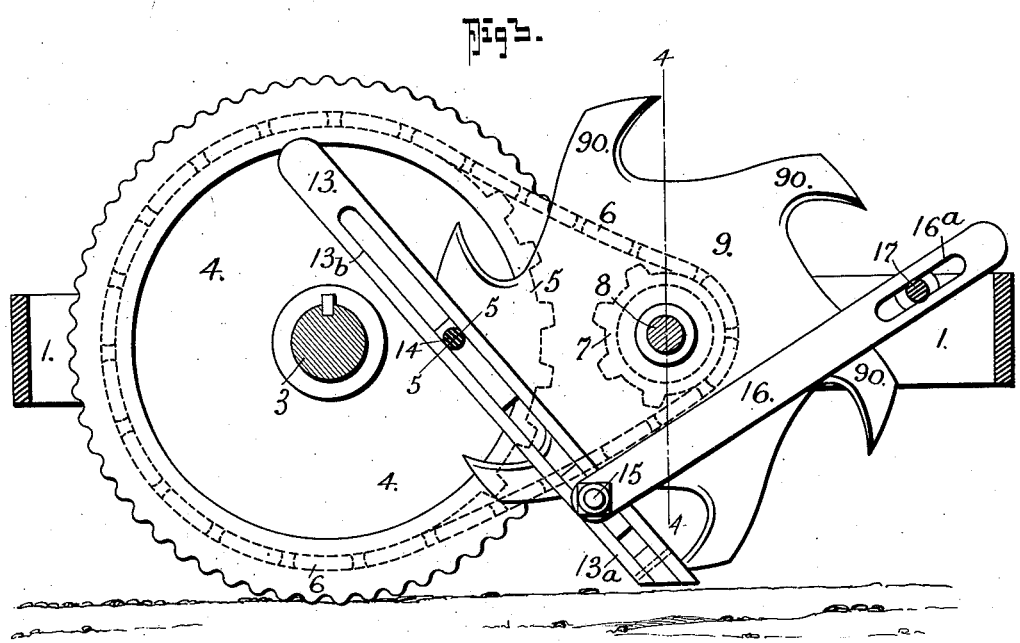
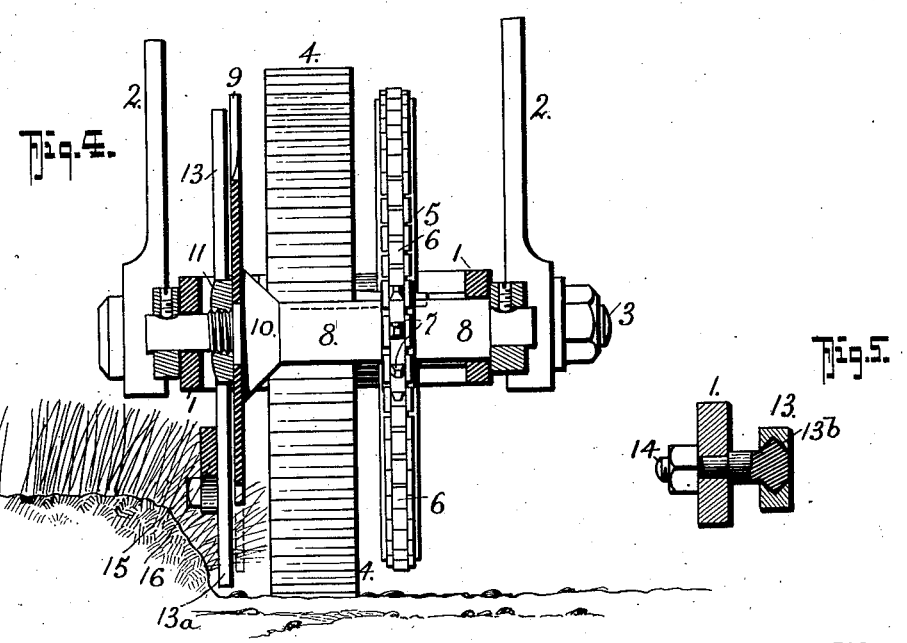
WITNESSES:
J. Theodore Schrott.
May Immich.
INVENTOR
Harry P. Dague.
BY
Fred J. Dieterich
ATTORNEY

UNITED STATES PATENT OFFICE.

HARRY P. DAGUE, OF AKRON, OHIO.

LAWN-EDGE TRIMMER.

937,579. Specification of Letters Patent. Patented Oct. 19, 1909.

Application filed March 19, 1909. Serial No. 484,464.

*To all whom it may concern:*

Be it known that I, HARRY P. DAGUE, residing at Akron, in the county of Summit and State of Ohio, have invented a new and Improved Lawn-Edge Trimmer, of which the following is a specification.

My invention, which in general relates to lawn trimming means, more specifically has for its object to provide a new and improved device, more especially adapted for trimming the edges of lawns, walks and plots that cannot be readily trimmed by the use of the ordinary types of lawn mowers and which are usually trimmed with shears or other similar means that entails considerable labor and inconvenience to the trimmer.

My invention, in its generic nature, comprehends a wheeled frame, a vertically disposed cutter whose cutting members are arranged to pass down close to the ground line and a means for engaging with the ground that acts as a gage for the lower or cutting edge of the cutter disk and which coöperates with the said disk edge for effecting the desired trimming or grass cutting operation.

In its more complete nature, my invention embodies certain features of construction and novel arrangement of parts capable of being economically made and coöperatively so combined as to provide for a simple manipulation of the device for effecting a positive and quick trimming operation as the device is guided and pushed along the edge of the lawn path or other points where it is inconvenient and impossible to drive or place a lawn trimmer of the type usually employed for lawn trimming, and in its more subordinate features my invention consists in certain details of construction and peculiar combination of parts, all of which will be hereinafter fully explained, specifically pointed out in the appended claims and illustrated in the accompanying drawings, in which:

Figure 1, is a perspective view of my complete device and illustrating the manner of its practical use. Fig. 2, is a top plan view thereof. Fig. 3, is a longitudinal section of the same, and Fig. 4, is a transverse section thereof on the line 4—4 on Fig. 3. Fig. 5, is a cross section on the line 5—5 on Fig. 3.

In the practical construction, my invention comprises a light rectangular frame to which is attached a handle or pusher 2 of any approved design and arrangement, the same being so positioned with respect to the frame that the device can be readily guided along the edges of lawns, paths, closely around monument bases, etc. in the manner clearly understood from Fig. 1 of the drawing. In the side members 1—1 of the frame is journaled a drive shaft 3 that carries a ground wheel 4 of the usual lawn mower type and the said shaft 3 also carries a large chain wheel or disk 5 for receiving the endless drive chain 6 that takes around a small sprocket disk or wheel 7 on the drive shaft 8 upon which is mounted the rotary cutter or knife 9, the construction of which is best shown in Fig. 3, by reference to which it will be readily seen the said cutter has a series of radially disposed shear edge blades 90 that sweep through the overhanging grass blades for severing them close to the ground as the cutter is revolved by the shaft 8, the said cutter being fixedly held on the said shaft by the clamp disk and nut members 10 and 11, best shown in Fig. 4.

It will be noticed by reference to Figs. 1 and 4 that the knife and the ground wheel are relatively so disposed that as the ground wheel rides beyond the lawn edge the knife can be guided to travel close up against the said lawn edge to trim the overhanging grass and as closely as is possible to trim it with ordinary hand clippers or shears employed for such purpose.

For steadying the cutter and causing it to make a clean cutting of the edge I have provided an adjustable shoe 13ª disposed in close proximity to the lowermost edge of the cutter blade, and in a plane below the said edge, it being so arranged that it will glide over the edge of the walk or curbing. The shoe 13ª in the construction shown, is the lower end of a thin slot bar 13 that has a longitudinal slot 13ᵇ, receiving at its upper end a bolt 14 secured in the side bar next the ground wheel, and the other end of the slot receives the stud bolt 15 on another thin bar 16 that extends in the plane of, but in a direction opposite to the bar 13, and the upper end of the bar 16 has an elongated slot 16ª for the stud bolt 17 fastened to the side bar 1, as shown. By providing a shoe as described and adjustably mounting it as shown, the said shoe can be readily set higher or lower with respect to the blades of the cutter and the ground wheel as the condition of the edge to be trimmed may make it desirable.

While I have shown the drive shaft connected with the ground wheel through a sprocket and chain connection, it is obvious the two sprocket wheels might be a large gear and pinion connection and while I prefer to arrange the adjustable shoe in the manner shown and described, it is obvious the detail of the same might be readily modified without departing from my invention or the scope of the appended claims.

When dragging the device over the field, the shoe and cutter can be readily held out of operation by pressing down on the handle to tilt the front end of the frame to raise the cutter and the guide from the ground.

From the foregoing, taken in connection with the accompanying drawings the operation and the advantages of my invention will be readily apparent.

My improvement is of a very light, inexpensive and stable nature, can be conveniently operated so the cutter can be set close up to the edges and at the angles desired to cut the places that cannot be reached by lawn mowing machines in general use.

What I claim is:

1. A lawn edge trimmer, comprising an enlarged frame, a ground wheel journaled in the rear portion thereof, a rotary cutter having radially disposed cutting blades, journaled in the frame in advance of the ground wheel between said wheel and the adjacent side of the frame and gear connections that join the wheel and the cutter shafts.

2. A lawn edge trimmer consisting of a rectangular frame, a ground wheel journaled midway thereof and in the rear end, a rotary cutter journaled in advance of the ground wheel and with its rear portion movable between the wheel and the adjacent frame side, and sprocket and chain devices on the other side of the wheel and cutter for driving the cutter.

3. In a lawn edge trimmer, a frame, a ground wheel having a shaft journaled in said frame, a rotary cutter having radially disposed blades and having a shaft journaled in said frame parallel to the first named shaft, gear connections between the ground wheel and the cutter, and an adjustable shoe comprising a member pivoted to said frame and having its lower edge disposed adjacent to the lowermost edge of the cutter, and a second member pivoted to said frame and pivoted to said first member.

4. In a lawn edge trimmer, a frame, a ground wheel having a shaft journaled in said frame, a rotary cutter having radially disposed blades and having a shaft journaled in said frame parallel to the first named shaft, gear connections between the ground wheel and the cutter, an adjustable shoe comprising a member pivoted to said frame and having its lower edge disposed adjacent to the lowermost edge of the cutter, a second member pivoted to said frame and pivoted to said first member, said first member having a slot through which its pivot passes and said second member having a slot through which its pivot passes, the pivot connection between the first and second members being adjustable.

5. A new and improved machine for trimming lawn edges and the like, consisting of a rectangular frame, a ground wheel journaled in the rear end thereof, a vertically revoluble cutter disk journaled in the front end of the frame at a point adjacent one side of the frame, gearing that connects the shafts of the ground wheel and the cutter, located adjacent the other side of the frame, an arm having a shoe end mounted on the side of the frame adjacent the cutter and having longitudinal adjustment with respect to the said frame side, said arm having a longitudinal slot extending to near its lower end, another arm mounted on the frame, having a longitudinal slot near its upper end, means passing through said slot and engaging said frame side to adjustably secure said other arm to said frame, said other arm having a stud bolt at the lower end for adjustably entering the lower end of the slot in the other arm.

HARRY P. DAGUE.

Witnesses:
 GRACE V. DAGUE,
 RHODA M. WEBB.